United States Patent
Bickham et al.

(10) Patent No.: US 7,505,660 B2
(45) Date of Patent: Mar. 17, 2009

(54) MICROSTRUCTURED TRANSMISSION OPTICAL FIBER

(75) Inventors: Scott Robertson Bickham, Corning, NY (US); Dana Craig Bookbinder, Corning, NY (US); Ming-Jun Li, Horseheads, NY (US); Daniel Aloysius Nolan, Corning, NY (US); Pushkar Tandon, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 11/800,161

(22) Filed: May 4, 2007

(65) Prior Publication Data

US 2008/0131066 A1 Jun. 5, 2008

Related U.S. Application Data

(60) Provisional application No. 60/920,425, filed on Mar. 28, 2007, provisional application No. 60/817,721, filed on Jun. 30, 2006.

(51) Int. Cl.
*G02B 6/02* (2006.01)
(52) U.S. Cl. .................. 385/125; 385/126; 385/123
(58) Field of Classification Search .................. None
See application file for complete search history.

(56) References Cited

U.S. PATENT DOCUMENTS

| | | | |
|---|---|---|---|
| 5,191,206 A | 3/1993 | Boiarski et al. | 250/227.14 |
| 5,802,236 A | 9/1998 | DiGiovanni et al. | 385/127 |
| 6,243,522 B1 | 6/2001 | Allan et al. | 385/123 |
| 6,317,551 B1 | 11/2001 | Mitchell et al. | 385/124 |
| 6,614,974 B2 | 9/2003 | Elrefaie et al. | 385/125 |
| 6,671,442 B2 | 12/2003 | Wang et al. | 385/125 |
| 6,687,445 B2 | 2/2004 | Carter et al. | 385/127 |
| 6,766,088 B2 | 7/2004 | Hasegawa et al. | 385/123 |
| 6,773,825 B2 | 8/2004 | Pickrell et al. | 428/566 |
| 6,795,635 B1 | 9/2004 | Fajardo et al. | 385/140 |
| 6,904,215 B2 | 6/2005 | Christoff et al. | 385/124 |
| 7,039,284 B2 | 5/2006 | Nakahara | 385/125 |
| 7,054,513 B2 | 5/2006 | Herz et al. | 385/12 |
| 7,072,552 B2 | 7/2006 | Manyam et al. | 385/125 |
| 7,142,758 B1 | 11/2006 | Herz et al. | 385/125 |
| 7,164,835 B2 | 1/2007 | Matsuo et al. | 385/127 |
| 7,174,078 B2 | 2/2007 | Libori et al. | 385/125 |

(Continued)

FOREIGN PATENT DOCUMENTS

EP 1437612 A2 12/2003

(Continued)

OTHER PUBLICATIONS

Baggett, Joanne C. et al, "Improving Bending Losses in Holey Fibers", Optical Fiber Communication Conference, 2005. Technical Digest. OFC/NFOEC, Mar. 6-11, 2005, vol. 3, 3 pp.

(Continued)

*Primary Examiner*—Sung H Pak
(74) *Attorney, Agent, or Firm*—Joseph M. Homa; Robert L. Carlson

(57) ABSTRACT

Microstructured optical fiber for single-moded transmission of optical signals, the optical fiber including a core region and a cladding region, the cladding region including an annular hole-containing region that contains non-periodically disposed holes. The optical fiber provides single mode transmission and low bend loss.

32 Claims, 6 Drawing Sheets

U.S. PATENT DOCUMENTS

| | | | |
|---|---|---|---|
| 2001/0038740 A1 | 11/2001 | Hasegawa | 385/123 |
| 2004/0069019 A1 | 4/2004 | Carter et al. | 65/414 |
| 2005/0094954 A1 | 5/2005 | Pickrell et al. | 385/123 |
| 2006/0034574 A1 | 2/2006 | Guan et al. | 385/125 |
| 2007/0104437 A1 | 5/2007 | Bookbinder et al. | 385/125 |
| 2008/0013905 A1 | 1/2008 | Bookbinder et al. | 385/124 |

FOREIGN PATENT DOCUMENTS

| | | |
|---|---|---|
| EP | 1617243 A1 | 3/2004 |
| EP | 1564569 A1 | 9/2004 |
| WO | WO02/075393 | 9/2002 |
| WO | WO02/102730 | 12/2002 |

OTHER PUBLICATIONS

Bing, Y. et al, "Low-loss Holey Fiber", Hitachi Cable Review No. 24, Aug. 2005, pp. 1-5.

Ellis, Frederick P. K., "Fabrication of Random Hole Optical Fiber Preforms by Silica Sol-Gel Processing", Thesis to be submitted to Virginia Polytechnic Institute and State University, Feb. 19, 2004, 34 pp.

Guan, Ning et al, "Characteristics of field confined holey fiber analyzed by boundary element method", OFC 2002, Mar. 17-22, 2002, pp. 525-527.

Holton, Carvel et al, "Colloidal Quantum Dots Entrained in Microstructured Optical Fibers", Proceedings of SPIE, 2004, vol. 5335, pp. 258-265.

Kominsky, D. et al, "Generation of random-hole optical fiber", Optics Letters, Aug. 15, 2003, vol. 23, No. 16, pp. 1409-1411.

Kominsky, Daniel, "Development of Random Hole Optical Fiber and Crucible Technique Optical Fibers", Dissertation submitted to Virginia Polytechnic Institute and State University, Sep. 6, 2005, 142 pp.

Matsuo, S. et al, "Bend-Insensitive and Low-Splice-Loss Optical fiber for Indoor Wiring in FTTH", Optical Fiber Communication Conference, 2004, Feb. 23-27, 2004, vol. 2, 3 pgs. with descriptive sheet attached.

Monro, Tanya M. et al, "Holey fibers with random cladding distributions", Optics Letters, Feb. 15, 2000, vol. 25, No. 4, pp. 206-208.

Monro, Tanya M. et al, "Holey fibers with randomly arranged air holes", Conference on Lasers and Electro-Optics, 2000. (CLEO 2000), pp. 607-608.

Monro, Tanya M. et al, "New possibilities with holey fibers", Optical Fiber Communication Conference, 2000, vol. 3, pp. 106-108.

Pickrell, Gary et al, "Fiber Optic Chemical Sensing", Proceedings of SPIE, vol. 5998, Nov. 5, 2005, 15 pp.

Pickrell, Gary et al, "Microstructural Analysis of Random Hole Optical Fibers", IEEE Photonics Technology Letters, Feb. 2004, vol. 16, No. 2, pp. 491-493.

Pickrell, Gary R. et al, "New fabrication technique for random-hole optical fibers", Proceedings of SPIE—The International Society for Optical Engineering, v 5589, Fiber Optic Sensor Technology and Applications III, Oct. 26-28, 2004, pp. 257-265.

Pickrell, Gary R. et al, "Novel Techniques for the Fabrication of Holey Optical Fibers", The International Society for Optical Engineering, v 4578, Fiber Optic Sensor Technology and Applications 2001, Oct. 30-Nov. 1, 2001, pp. 271-282.

Pickrell, G. et al, "Random-hole optical fiber evanescent-wave gas sensing", Optics Letters, Jul. 1, 2004, vol. 29, No. 13, pp. 1476-1478.

Pickrell, Gary R. et al, "Random Hole Optical Fibers", Proceedings of SPIE, Industrial and Highway Sensors Technology, 2003, vol. 5272, pp. 207-215.

Richardson, D. J. et al, "Advances in Microstructured Fiber Technology", Proceedings of 2005 IEEE/LEOS Workshop on Fibres and Optical Passive Components, Jun. 22-24, 2005, pp. 1-9.

Shinohara, Hiromichi, "Broadband Access in Japan: Rapidly Growing FTTH Market", IEEE Communications Magazine, Sep. 2005, pp. 72-78.

Wu, Tzong-Lin et al, "A Novel Ultraflattened Dispersion Photonic Crystal Fiber", IEEE Photonics Technology Letters, Jan. 2005, vol. 17, No. 1, pp. 67-69.

U.S. Appl. No. 11/583,098, filed Oct. 18, 2006, entitled "Microstructured Optical Fibers and Methods".

MICROSTRUCTURED TRANSMISSION OPTICAL FIBER

CROSS-REFERENCE TO RELATED APPLICATIONS

This application claims the benefit of and priority to U.S. Provisional Patent Application No. 60/817,721 filed on Jun. 30, 2006, and U.S. Provisional Patent Application No. 60/920,425 filed on Mar. 28, 2007, the contents of which are relied upon and incorporated herein by reference in their entirety.

BACKGROUND OF THE INVENTION

1. Field of the Invention

The present invention relates generally to optical fibers, and more specifically to microstructured optical fibers.

2. Technical Background

Optical fibers formed of glass materials have been in commercial use for more than two decades. Although such optical fibers have represented a quantum leap forward in the field of telecommunications, work on alternative optical fiber designs continues. One promising type of alternative optical fiber is the microstructured optical fiber, which includes holes or voids running longitudinally along the fiber axis. The holes generally contain air or an inert gas, but may also contain other materials. The majority of microstructured fibers have a plurality of holes located around the core, wherein the holes continue for a relatively long (e.g. for many tens of meters or more) distance along the length of the fiber, and typically the holes extend along the entire length of the optical fiber. These cladding holes are also most typically arranged in a regular, periodic formation around the core of the optical fiber. In other words, if cross sections of the optical fiber are taken along the length of the optical fiber, the same individual holes can be found in essentially the same periodic hole structure relative to one another. Examples of such microstructured fibers include those described in U.S. Pat. No. 6,243,522.

Microstructured optical fibers may be designed to have a wide variety of properties, and may be used in a wide variety of applications. For example, microstructured optical fibers having a solid glass core and a plurality of holes disposed in the cladding region around the core have been constructed. The position and sizes of the holes may be designed to yield microstructured optical fibers with dispersions ranging anywhere from large negative values to large positive values. Such fibers may be useful, for example, in dispersion compensation. Solid-core microstructured optical fibers may also be designed to be single moded over a wide range of wavelengths. Most solid-core microstructured optical fibers guide light by a total internal reflection mechanism; the low index of the holes acts to lower the effective index of the cladding region in which they are disposed.

Micro-structured optical fibers are typically manufactured by the so-called "stack-and-draw" method, wherein an array of silica rods and/or tubes are stacked in a close-packed arrangement to form a preform, that can be drawn into fiber using a conventional tower setup. There are several disadvantages to the stack and draw method. The awkwardness of assembling hundreds of very thin canes (defined by rods or tubes), as well as the possible presence of interstitial cavities when stacking and drawing cylindrical canes, may affect dramatically the fiber attenuation by introducing soluble and particulate impurities, undesired interfaces and inducing a reshaping or deformation of the starting holes. Moreover, the relatively low productivity and high cost make this method not much suitable for industrial production.

SUMMARY OF THE INVENTION

Microstructured optical fibers are disclosed herein comprising a core region and a cladding region surrounding the core region, the cladding region comprising an annular hole-containing region comprised of non-periodically disposed holes such that the optical fiber is capable of single mode transmission at one or more wavelengths in one or more operating wavelength ranges. The core region and cladding region provide improved bend resistance, single mode operation at wavelengths preferably greater than or equal to 1500 nm, in some embodiments also greater than 1400 nm, in other embodiments also greater than 1260 nm. The optical fibers preferably provide a mode field at a wavelength of 1310 nm preferably greater than 8.0 microns, more preferably between 8.0 and 10.0 microns. In preferred embodiments, optical fiber disclosed herein is thus single-mode transmission optical fiber. Preferably, the holes or voids are located substantially, and more preferably entirely in a region of the cladding of the fiber such that they surround the core in a void containing region, and the voids are preferably substantially absent from the core region, i.e., the core is preferably solid and void-free. In some preferred embodiments, the voids are located in void containing regions which are spaced apart from the core of the optical fiber. For example, a relatively thin (e.g. having a radial width less than 40 microns, and more preferably less than 30 microns) ring of a void containing region can be spaced apart from the core of the optical fiber, but not extending entirely to the outer perimeter of the optical fiber. The optical fiber may or may not include germania or fluorine to also adjust the refractive index of the core and or cladding of the optical fiber, but these dopants can also be avoided and instead, the voids alone can be used to adjust the refractive index of the cladding with respect to the core such that light is guided down the core of the fiber. While index of refraction adjusting dopants may be avoided, preferably at least one of germania or fluorine or a similar index of refraction adjusting dopant is employed together with the non-periodically distributed voids located in the cladding region of the optical fiber. However, use of germania and/or fluorine is not critical and, for example, the fiber could if desired be entirely or substantially devoid of both germania and fluorine.

In some embodiments, the microstructured optical fiber disclosed herein comprises a core region disposed about a longitudinal centerline, and a cladding region surrounding the core region, the cladding region comprising an annular hole-containing region comprised of non-periodically disposed holes, wherein the annular hole-containing region has a maximum radial width of less than 12 microns, the annular hole-containing region has a regional void area percent of less than 30 percent, and the non-periodically disposed holes have a mean diameter of less than 1550 nm.

By "non-periodically disposed" or "non-periodic distribution", we mean that when one takes a cross section (such as a cross section perpendicular to the longitudinal axis) of the optical fiber, the non-periodically disposed holes are randomly or non-periodically distributed across a portion of the fiber. Similar cross sections taken at different points along the length of the fiber will reveal different cross-sectional hole patterns, i.e., various cross sections will have different hole patterns, wherein the distributions of holes and sizes of holes do not match. That is, the voids or holes are non-periodic, i.e., they are not periodically disposed within the fiber structure. These holes are stretched (elongated) along the length (i.e.

parallel to the longitudinal axis) of the optical fiber, but do not extend the entire length of the entire fiber for typical lengths of transmission fiber. While not wishing to be bound by theory, it is believed that the holes extend less than a few meters, and in many cases less than 1 meter along the length of the fiber.

Spacing the hole-containing region (hole-containing ring or intermediate annular region) apart from the core assists in lowering the attenuation of the optical fiber 1550 nm. Additionally, limiting the radial extent of the hole-containing region facilitates single mode transmission within the optical fiber.

The fibers disclosed herein can be made using a relatively low cost manufacturing process, because expensive dopants such as fluorine and/or germania can be avoided in the hole-containing region, if desired, and the stack and draw manufacturing process of arranging spatially periodically disposed holes in the glass part of the optical fiber can likewise be avoided, if desired. Alternatively, the methods disclosed herein can be used simply to add holes or voids to a cladding of a fiber which is doped with one or more of germania, phosphorous, aluminum, ytterbium, erbium, fluorine or other conventional fiber dopant materials, or which also contains spatially periodically disposed holes in the cladding, to increase the bend resistance thereof. In some embodiments disclosed herein, the optical fiber contains no, or essentially no, fluorine or boron.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description serve to explain the principles and operations of the invention.

DETAILED DESCRIPTION OF THE PREFERRED EMBODIMENTS

Figure 1:
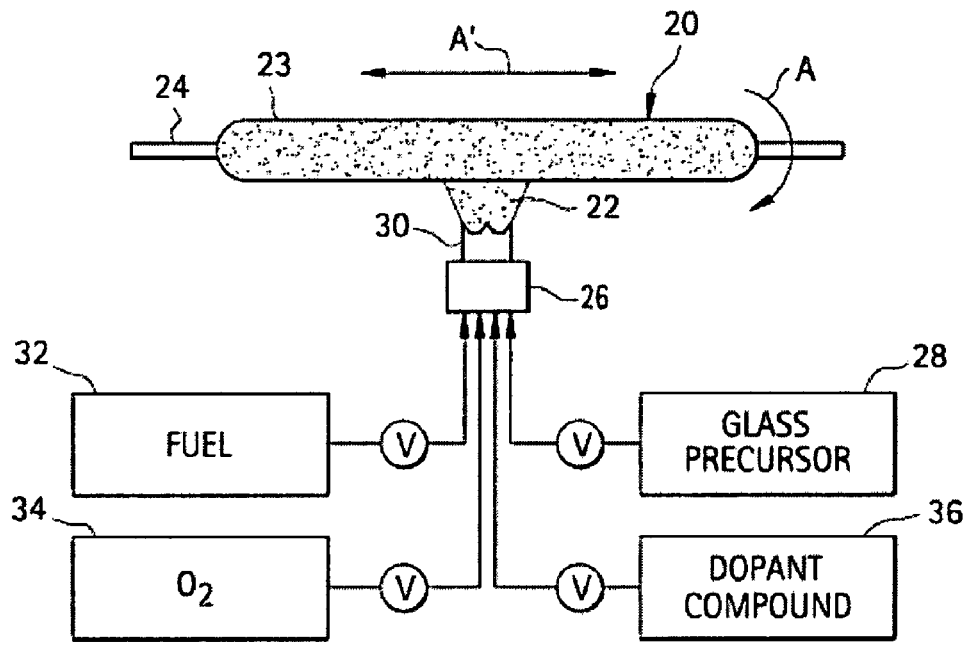
FIG. 1 illustrates an OVD method for forming a soot preform.

Optical fiber disclosed herein can be made the methods described below which utilize preform consolidation conditions which are effective to result in a significant amount of gases being trapped in the consolidated glass blank, thereby causing the formation of voids in the consolidated glass optical fiber preform. Rather than taking steps to remove these voids, the resultant preform is used to form an optical fiber with voids, or holes, therein. As used herein, the diameter of a hole is the longest line segment whose endpoints are disposed on the silica internal surface defining the hole when the optical fiber is viewed in perpendicular cross-section transverse to the longitudinal axis of the fiber.

The "relative refractive index percent" is defined as $\Delta\% = 100 \times (n_i^2 - n_c^2)/2n_i^2$, where $n_i$ is the maximum refractive index in region i, unless otherwise specified, and $n_c$ is the refractive index of pure (undoped) silica. The term "α-profile" or "alpha profile" refers to a relative refractive index profile, expressed in terms of $\Delta(r)$ which is in units of "%", where r is radius, which follows the equation, $$\Delta(r) = \Delta(r_o)(1 - [|r - r_o|/(r_1 - r_o)]^\alpha),$$

where $r_o$ is the point at which $\Delta(r)$ is maximum, $r_1$ is the point at which $\Delta(r)\%$ is zero, and r is in the range $r_i \leq r \leq r_f$, where $\Delta$ is defined above, $r_i$ is the initial point of the α-profile, $r_f$ is the final point of the α-profile, and α is an exponent which is a real number.

The actual fiber cutoff can be measured by the standard 2m fiber cutoff test, FOTP-80 (EIA-TIA-455-80), to yield the "fiber cutoff wavelength", also known as the "2 m fiber cutoff" or "measured cutoff" or "fiber cutoff".

Cabled cutoff measurement is performed using the standard 22 m test described in EIA-455-170 Cable Cutoff Wavelength of Single-mode Fiber by Transmitted Power, or "FOTP-170".

The mode field diameter (MFD) is measured using the Peterman II method wherein, $2w = MFD$, and $w^2 = (2\int f^2 r \, dr/\int [df/dr]^2 r \, dr)$, the integral limits being 0 to ∞. All optical properties (such as dispersion, dispersion slope, bending, etc.) are reported herein at a wavelength of 1550 nm unless otherwise noted.

During the manufacture of transmission optical fibers by conventional soot deposition processes such as the outside vapor deposition (OVD) process or the vapor axial deposition (VAD) process, silica and doped silica particles are pyrogenically generated in a flame and deposited as soot. In the case of OVD, silica soot preforms are formed layer-by-layer by deposition of the particles on the outside of a cylindrical target rod by traversing the soot-laden flame along the axis of the cylindrical target. Such porous soot preforms are subsequently treated with a drying agent (e.g., chlorine) to remove water and metal impurities and are then consolidated or sintered into glass blanks at temperatures ranging from 1100-1500° C. Surface energy driven viscous flow sintering is the dominant mechanism of sintering, which results in densification and closing of the pores of the soot, thereby forming a consolidated glass preform. During the final stages of sintering, the gases used in consolidation may become trapped as the open pores are closed. If the solubility and permeability of the trapped gases in the glass are high at the sintering temperature, then the gases are able to migrate through and out of the glass during the consolidation process. Alternatively, gases which are still trapped after the consolidation phase of the fiber manufacturing process may be outgassed by holding the fiber preforms for a period until the gases migrate out through the glass preforms, thereby leaving one or more voids with vacuum therein within the preform. During the draw operation when the optical fiber is drawn from the preform, these voids close, leaving a void-free or essentially void-free optical fiber. In consolidation processes which are employed to make conventional transmission optical fiber, the goal is to achieve an optical fiber that is entirely free of voids in both the core and cladding region of the optical fiber. Helium is often the gas utilized as the atmosphere during the consolidation of conventional optical fiber preforms. Because helium is very permeable in glass, it very easily exits the soot preform and the glass during the consolidation process, so that after consolidating in helium the glass is free of pores or voids.

The optical fiber disclosed herein is made from a preform that was subjected to preform consolidation conditions which are effective to result in a significant amount of gases being trapped in the consolidated glass blank, thereby causing the formation of non-periodically distributed voids in the consolidated glass optical fiber preform. Rather than taking steps to remove these voids, the resultant preform is purposefully used to form an optical fiber with voids therein. In particular, by utilizing relatively low permeability gases and/or relatively high sintering rates, holes can be trapped in the consolidated glass during the consolidation process. The sintering rate can be increased by increasing the sintering temperature and/or increasing the downfeed rate of the soot preform through the sintering zone of the consolidation furnace. Under certain sintering conditions, it is possible to obtain glasses in which the area fraction of the trapped gases is a significant fraction of the total area or volume of the preform.

In the optical fiber disclosed herein, the non-periodically distributed holes or voids which are present in the optical fiber as a result of using the processes disclosed herein are located in the cladding of the optical fiber. Such voids can be used to lower refractive index. By utilizing the consolidation parameters so that the maximum diameter of the holes or voids is less than the wavelength of the light which is to be transmitted along the length of the fiber (e.g. in the case of optical fibers for use in telecommunications applications, less than 1550 nm), the fiber may be effectively used to transmit information at a particular wavelength.

FIG. 1 illustrates a method of manufacturing a soot optical fiber preform 20 which can be used to make the optical fiber disclosed herein. In the embodiment illustrated in FIG. 1, soot preform 2 is formed by depositing silica-containing soot 22 onto an outside of a rotating and translating mandrel or bait rod 24. This process is known as the OVD or outside vapor deposition process. Mandrel 24 is preferably tapered. The soot 22 is formed by providing a glass precursor 28 in gaseous form to the flame 30 of a burner 26 to oxidize it. Fuel 32, such as methane (CH4), and combustion supporting gas 34, such as oxygen, are provided to the burner 26 and ignited to form the flame 30. Mass flow controllers, labeled V, meter the appropriate amounts of suitable dopant compound 36 silica glass precursor 28, fuel 32 and combustion supporting gas 34, all preferably in gaseous form, to the burner 26. The glass former compounds 28, 36 are oxidized in the flame 30 to form the generally cylindrically-shaped soot region 23. In particular, a dopant compound 36 may be included if desired. For example, a germanium compound may be included as an index of refraction increasing dopant (e.g. in the core of the fiber), or a fluorine containing compound may be included to lower the index of refraction (e.g. in the cladding and/or void containing region of the fiber).

Figure 3:
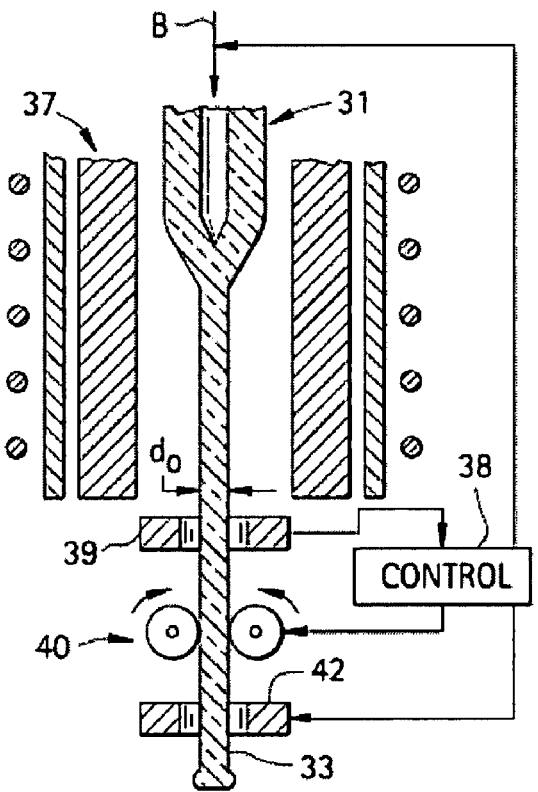
FIG. 3 illustrates a redraw process for forming a core cane.
Figure 2:
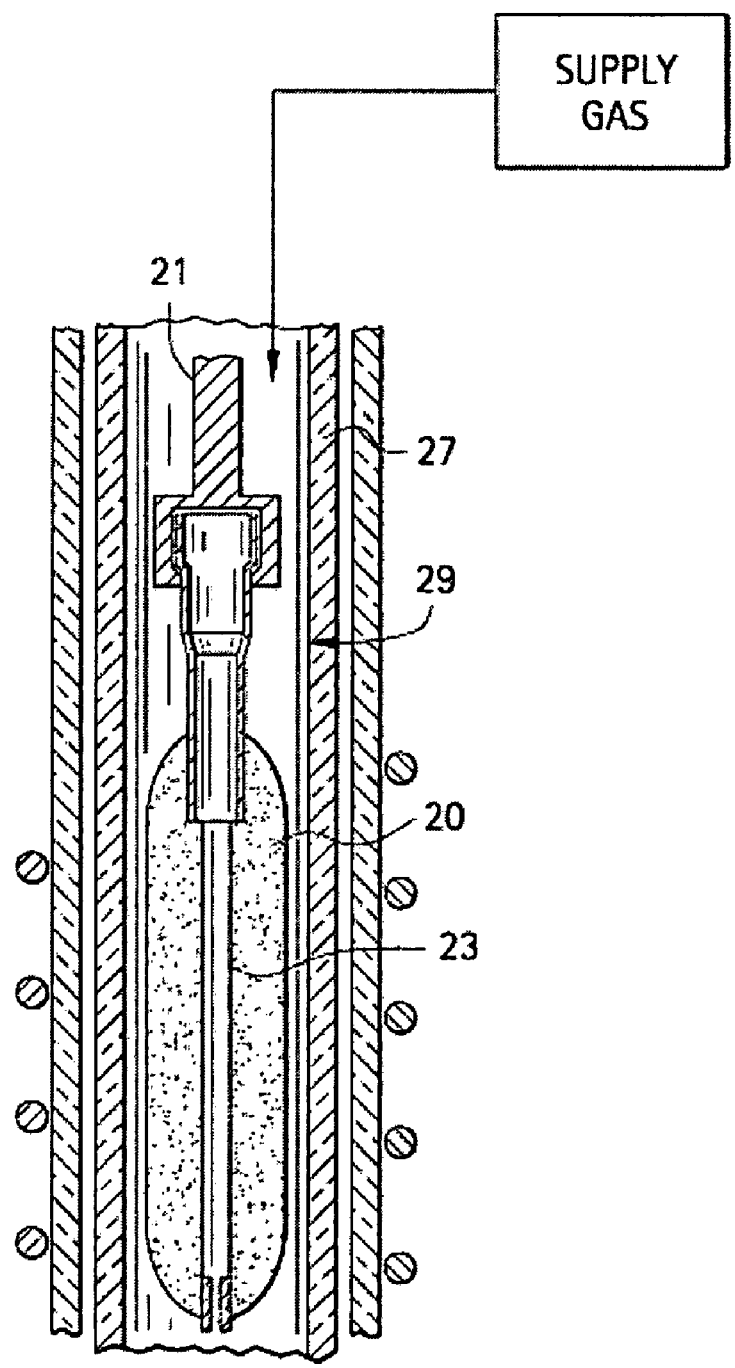
FIG. 2 illustrates a cross-sectional side view of a consolidation process in accordance with the invention.

As illustrated in FIG. 2, the soot preform 20 including the cylindrical soot region 23 may be consolidated in a consolidation furnace 29 to form a consolidated blank 31 (shown in subsequent FIG. 3). Prior to consolidation, the mandrel 24 illustrated in FIG. 1 is removed to form a hollow, cylindrical soot blank preform. During the consolidation process, the soot preform 20 is suspended, for example, inside a pure quartz muffle tube 27 of the furnace 29 by a holding mechanism 21. Preferably, before the consolidation step the preform 20 is exposed to a drying atmosphere. For example, a suitable drying atmosphere may include about 95 percent to 99 percent helium and 1 percent to 5 percent chlorine gas at a temperature of between about 950° C. and 1250° C. and a suitable drying time ranges from about 0.5 and 4.0 hours. The soot preform can also be doped, if desired, for example using a dopant gas having fluorine or other optical fiber dopants therein. For example, to dope with fluorine, $SiF_4$ and/or $CF_4$ gas may be employed. Such dopant gases may be employed using conventional doping temperatures, for example between about 950 and 1250° C. for 0.25 to 4 hours.

During the consolidation step, which preferably takes place after a soot drying step, the furnace temperature is raised and the preform 20 is consolidated at a suitable temperature, for example between about 1390° C. and 1535° C. to form a consolidated preform. Alternatively, and more preferably, gradient sintering may be employed whereby the soot preform 20 is driven down through a hot zone of the furnace 29 which is maintained at a temperature of between about 1225° C. to 1550° C., more preferably between about 1390° C. and 1535° C. For example, the preform may be held in an isothermal zone which is maintained at a desired drying temperature (950-1250° C.), after which the soot preform is driven through a zone which is maintained at a desired consolidation temperature (e.g. 1225° C. to 1550° C., more preferably 1390° C. and 1535° C.) at a rate of speed which is sufficient to result in the preform 20 temperature increasing by greater than 1° C./min. Upper zones of the furnace can be maintained at lower temperatures which facilitate a drying and impurity removal step. The lower zone can be maintained at the higher temperatures desired for consolidation. In one preferred embodiment, the soot containing preform is downfed through a consolidation hot zone at a first downfeed rate, followed by downfeeding of the preform through a second hot zone at a second downfeed rate which is less than that of the first downfeed rate. Such a consolidation technique results in the outside portion of the soot preform sintering before the rest of the preform sinters, thereby facilitating trapping of gases which will in turn facilitate formation of and retaining of voids in the resultant consolidated glass. For example, the preform can be exposed to such suitable consolidation temperatures (e.g. greater than about 1390° C.) at a first speed which is sufficient to result in the preform temperature increasing by more than 15° C./min, more preferably greater than 17° C./min, followed by at least a second downfeed rate/consolidation temperature combination which is sufficient to result in the preform heating by at least about 12° C./min, more preferably greater than 14° C./min. Preferably, the first consolidation rate results in the outside of the preform increasing in temperature at a rate which is greater than 2, more preferably greater than 3, and most preferably greater than about 4° C./min higher than the heating rate of the second consolidation rate. If desired, a third consolidation step can be employed which heats at a slower rate (e.g. less than 10° C./min). Alternatively, the soot preform can be sintered at even faster rates in order to create more voids by driving the soot preform through a furnace hot zone where the temperature is greater than 1550° C., more preferably greater than 1700° C., even more preferably greater than 1900° C. Alternatively, the soot preform can be sintered at even faster rates external to the furnace by using an open flame or plasma torch in contact with the soot.

Preferred sintering gases which may be used in the consolidation step are those which comprise at least one gas selected from the group consisting of nitrogen, argon, $CO_2$, oxygen, Chlorine, $CF_4$, CO, $SO_2$, krypton, neon, and mixtures thereof. Each of these gases exhibits a relatively low permeability in silica glass at or below the consolidation temperature which is suitable for forming voids in accordance with the methods present invention. Preferably these void producing gases are employed either alone or in combination in an amount between 5 and 100 percent by volume, more preferably between about 20-100 percent by volume and most preferably between about 40-100 percent by volume. The remainder of the sintering gas atmosphere is made up of a suitable diluent or carrier gas such as, for example, helium, hydrogen, deuterium, or mixtures thereof. Generally speaking, the greater the percentage by volume of void producing gases (nitrogen, Ar, $CO_2$, $O_2$, $Cl_2$, $CF_4$, CO, $SO_2$, krypton, neon, or mixtures thereof) that is employed in the sintering gas, the larger and more abundant the voids will be in the resultant consolidated glass. More preferably, the sintering gas for use in forming the voids during the consolidation step comprises at least one gas selected from the group consisting of nitrogen, argon, $CO_2$, oxygen, and krypton, neon, and mixtures thereof. These gases can be utilized entirely alone or in mixtures of such gases along with a carrier gas such as helium. One particularly preferred void producing gas is nitrogen. Applicants have found when employing nitrogen and/or argon either together or individually as a void producing sintering gas it is preferred that the nitrogen and/or argon be employed in the sintering atmosphere in an amount greater that 10 percent by volume, more preferably greater than 30 percent by volume, even more preferably greater than about 50 percent by volume, and most preferably greater than about 65 percent by volume, with the remainder of the sintering atmosphere being a carrier gas such as helium. These gases have been successfully employed at concentrations greater than 85 percent by volume. In fact, up to 100 percent nitrogen gas, up to 100 percent argon gas, and up to 100 percent oxygen gas have been utilized successfully. Voids can also be created by sintering the soot in a low permeability gas (e.g. nitrogen, argon, $CO_2$, oxygen, Chlorine, $CF_4$, CO, $SO_2$) under a partial vacuum (e.g., wherein the preform is immersed in a sintering atmosphere is at a pressure of between about 40 to 750 Torr), and in such cases use of a diluent relatively high permeability gas such as helium is not necessary. Using the void producing consolidation techniques disclosed herein, it is possible to make optical fibers having a cladding comprises a void containing region having a regional void area percent greater than 0.5 percent in some embodiments, greater than about 1% in other embodiments, greater than about 5% in still other embodiments, and greater than about 10 percent in yet other embodiments. Regional void area percent, as used herein, means the total area of the voids in a void containing region divided by the total area of the void containing region (when the optical fiber is viewed in cross-section taken perpendicular to the axis of the optical fiber) times 100, the void containing region being defined by the inner and outer boundaries of the void containing region. For example, if the radially innermost edge of the radially innermost void in the fiber has a radial location of 4 microns from the axial centerline of the fiber, and the radially outermost edge of the radially outermost void in the fiber has a radial location of 60 microns from the centerline, then the area of the void containing region is approximately 11309−50=11259 square microns. If the total cross sectional area of voids contained in this void containing region is 1100 square microns, then the void area percent of the void containing region is approximately 9.8 percent.

In combination with the other sintering gases described above, it is desirable to employ a consolidation process which includes a downfeed of the preform at a rate and temperature which is sufficient to result in at least some of the consolidation gases being intentionally trapped. This can occur, for example, by heating of at least a portion of the soot preform greater than about 10° C./min, more preferably greater than about 12° C./min, even more preferably greater than about 14° C./min. The sintering temperatures employed in the present invention preferably can range from 1100° C. to 1600° C., more preferably between about 1400 and 1550° C., and most preferably between about 1480 and 1550° C. One particularly preferred sintering temperature is approximately 1490° C. Additional information related to manufacturing such void containing regions within the cladding of the optical fiber can be found, for example, in U.S. patent application Ser. No. 11/583,098, the specification of which is hereby incorporated by reference in its entirety.

FIG. 3 illustrates a process which may be used to draw a core cane for use in the present invention. For example in one such embodiment, a soot preform is formed as described above with respect to FIG. 1, after which the soot preform is consolidated using conventional consolidation techniques (e.g., using consolidation temperatures of higher than 1300° C. in an atmosphere of 100 percent helium) to form a void free core preform. For example, in the case of a fiber preform which is to be used to make a pure silica core fiber, the core preform would consist of relatively pure silica with no significant index of refraction adjusting dopants. Alternatively, in the case of an optical fiber preform which is to be used to make a pure germania doped core fiber, the core preform could consist of a germania doped core region and optionally a portion of the cladding (e.g. undoped silica cladding). The resultant consolidated core blank 31 is placed in a core cane draw furnace 37 and at least one rod-shaped core cane segment 33 having a reduced outer diameter is drawn therefrom. The preform blank 31 is heated to a temperature of, for example, between about 1700° C. and 2000° C. The controls 38 control the tension applied to the cane by suitable control signals to a tension mechanism 40, shown here as two tractor wheels, to draw down the cane 33 at the proper speed. In this way, it is possible to derive a length of core cane 33 having an outer diameter dimension of for example between about 1 mm and 16 mm. This core cane can then be used as the target or mandrel 24 for additional soot deposition or as the rod in a rod in tube process, as will be described further below.

Figure 4:
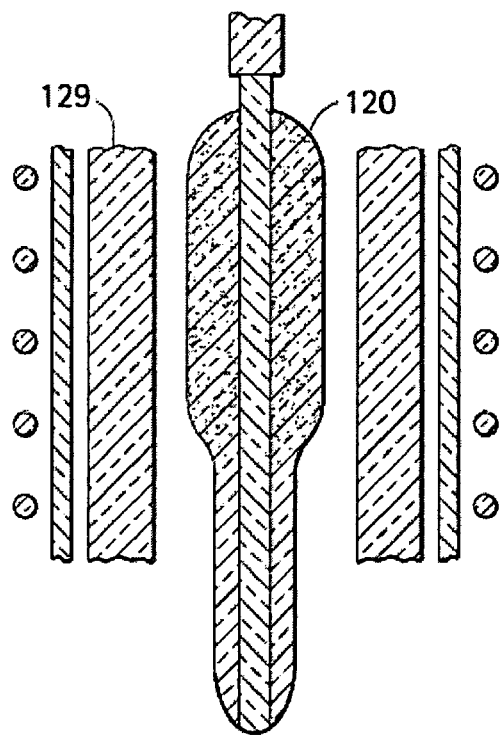
FIG. 4 illustrates consolidation of soot which has been deposited onto a core cane.

In one preferred embodiment, the process described above with respect to FIG. 3 can be used to form a core cane blank which can then be used as the target or mandrel for additional soot deposition which will be consolidated using the void forming techniques disclosed herein and thus eventually become the cladding of the optical fiber. In one such embodiment, for example, a fully consolidated, void free glass core cane can be used as the bait rod 24 in the soot deposition step illustrated in FIG. 1. The glass core cane may be undoped silica so the resultant optical fiber will be silica core fiber whose core consists essentially of pure silica. Alternatively, the core cane may consist of one or more doped regions which together form the light transmitting core region of the optical fiber. After the soot is deposited onto the glass core cane, the outer soot region 120 can be fully consolidated in consolidation furnace 129 as illustrated in FIG. 4. Preferably, during this consolidation step, the void forming consolidation process described above is carried out to form a consolidated optical fiber preform 150, as illustrated in FIG. 5.

As described above, preferred gases for use in the void forming consolidation step include at least one gas selected from the group consisting of nitrogen, argon, $CO_2$, oxygen, Chlorine, CF4, CO, $SO_2$, krypton, neon, and mixtures thereof. Preferably these void producing gases are employed either alone or in combination in an amount between 5 and 100 percent by volume, more preferably between about 20-100 percent by volume and most preferably between about 40 and 100 percent by volume. The remainder of the sintering gas atmosphere is made up of a suitable diluent or carrier gas such as, for example, helium, hydrogen, deuterium, or mixtures thereof. Generally speaking, the greater the percentage of void producing gases (nitrogen, Ar, $CO_2$, Kr, $O_2$, $Cl_2$, $CF_4$, CO, $SO_2$, Ne) employed in the sintering gas, the larger and more abundant the voids will be in the resultant consolidated glass. One particularly preferred void producing gas is nitrogen, which is preferably employed in an amount greater that 10 percent by volume, more preferably greater than 30 percent by volume, even more preferably greater than about 50 percent by volume, and most preferably greater than about 65 percent by volume, with the remainder of the sintering atmosphere being a carrier gas such as, for example, helium. Voids can also be created by sintering the soot in a low permeability diluent gas (e.g. nitrogen, argon, $CO_2$, oxygen, Chlorine, $CF_4$, CO, $SO_2$) under a partial vacuum (e.g., wherein the sintering atmosphere is at a pressure of between about 40 to 750 Torr), and in such cases use of a diluent relatively high permeability gas such as helium is not necessary. Using the void producing consolidation techniques disclosed herein, it is possible to make optical fibers whose cladding comprises a void containing region having a regional void area percent greater than 0.5 percent, more preferably greater than about 1, even more preferably greater than about 5 and most preferably greater than about 10 percent. Most preferably, the region having holes does not extend to the outer edge of the cladding such that there are open voids or holes on the outside of the fiber.

The sintering temperatures employed in the present invention preferably range from 1100° C. to 1550° C., more preferably between 1300° C. and 1500° C., and most preferably between 1350° C. and 1500° C. One preferred sintering temperature is approximately 1490° C. The gaseous atmosphere employed during the consolidation process, the temperature inside the consolidation furnace, and preform consolidation rate are selected so that, during the soot consolidation process, gases are intentionally trapped within the preform, forming holes in the consolidated glass. These gas containing voids are preferably not entirely outgassed prior to and/or during the fiber draw process, so that the voids remain in the fiber after the fiber has been drawn. A variety of process parameters can be controlled to vary and control the size of the voids. For example, increasing the consolidation time or temperature can increase the void size, as the increased temperature causes the gases trapped within the voids to expand. Similarly, the size and area percent of the voids can be impacted by the draw conditions. For example, a longer hot zone in a draw furnace and/or faster draw speeds tend to increase the size as well as the area percent of the holes. Selection of a gas that is more permeable in glass at the consolidation temperature will result in smaller voids. Sintering rate can also have a significant effect on hole size and hole quantity. A faster sintering rate will result in the formation of more and larger voids. However, use of sintering rates that are too slow will result in no voids being formed, as the gas will have time to escape through the glass. Consequently, the downfeed rate of the preform and/or the consolidation temperature employed are preferably high enough to result in the heating of at least a portion of the preform at a rate greater than about 10° C./min, more preferably greater than about 12° C./min, even more preferably greater than about 14° C./min. Generally speaking, an optical fiber preform having a lower soot density will result in formation of more voids. However, the density of the deposited soot in a particular optical fiber preform can be varied to position more holes (higher regional void area percent) where desired. For example, a first high density soot region can be deposited directly onto a consolidated glass (e.g. pure silica) core cane, followed by a second region of soot having a lower density than that of the first. We have found that this causes a higher void area percent to form near the core (i.e. in the high density soot region). The silica containing soot preferably has a bulk density of between about 0.10 g/cc and 1.7 g/cc, more preferably between about 0.30 g/cc and 1.0 g/cc. This effect can also be used to form consolidated void containing preforms which alternate between low or no void containing regions and higher void containing regions; wherein the initial soot density radial variation is greater than 3 percent over a distance of at least 100 microns. Such preforms can be used, for example, to make optical fibers having cladding regions which alternate between regions of void free glass and void containing glass. Fibers having such alternating void containing and void-free regions would exhibit properties useful as Bragg gratings.

Figure 5:
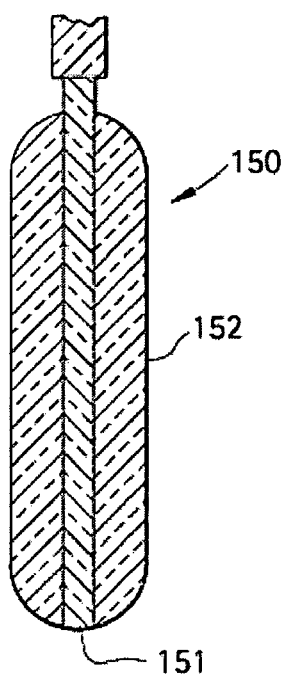
FIG. 5 illustrates the fully consolidated preform which results from the consolidation step illustrated in FIG. 4.

Referring to FIG. 5, using the techniques described above, an optical fiber preform 150 can be formed which comprises a void-free core region 151 which is surrounded by a cladding 152 which is comprised of a plurality of voids. By forming the void containing region in cladding 152 with a sufficient number of voids of an appropriate size, cladding 152 will serve as an optical cladding which guides light along core region 151 after the optical fiber preform is drawn into an optical fiber. Alternatively, the void containing region can be employed to improve the bend performance of the optical fiber. If desired, prior to drawing the preform 150 into an optical fiber, additional soot can be deposited over cladding region 152 and consolidated. The additional deposited cladding material may or may not be consolidated to contain voids, as desired.

Figure 6:
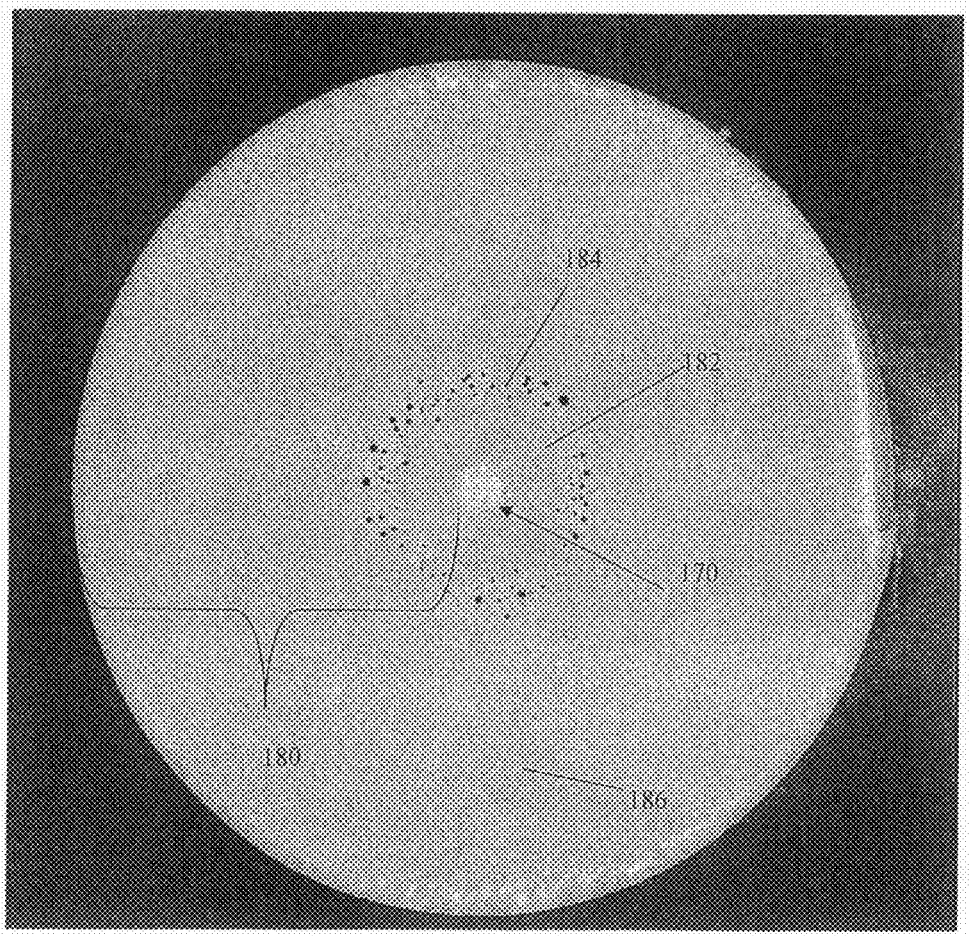
FIG. 6 illustrates a photograph of a cross-section of a fiber made in accordance with one embodiment of the invention.

An example of a fiber which is drawn from such a preform is illustrated in FIG. 6. The fiber in FIG. 6 comprises a core region which is surrounded by a cladding region which comprises voids which are positioned to be effective to guide light along the silica core.

Alternatively, instead of depositing soot onto an already formed core cane, the void forming process described above can be used to form a tube of consolidated glass having a void containing region therein as described above with respect to FIG. 2, and that tube can be used to sleeve a core cane.

Figure 7:
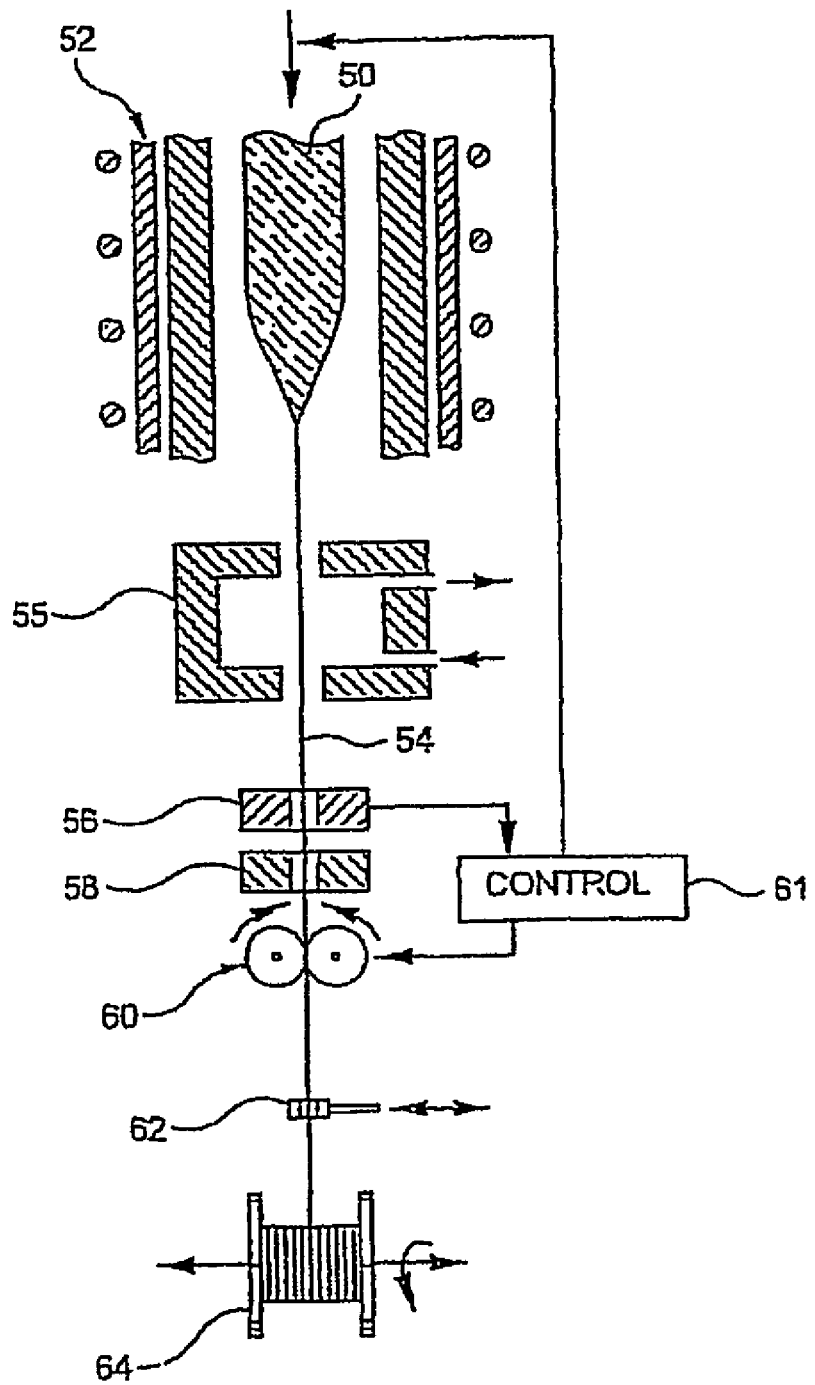
FIG. 7 illustrates a draw process and apparatus that may be employed in the method of the present invention.

In any of the embodiments disclosed herein, the resulting final consolidated optical fiber preform 50 may be drawn into an optical fiber by positioning the preform within a draw furnace 52 as shown in FIG. 7, and then heating and drawing the optical fiber 54 using conventional methods and apparatus. The fiber 54 is then cooled in cooling chamber 55 and measured for final diameter by non-contact sensor 56. One or more coatings may be applied and cured by coating apparatus 58. During draw, the fiber 54 passes through a tension assembly 60 whereby tension is applied to draw the fiber 54 from the preform 50. The tension is controlled via control apparatus 61 to maintain the fiber diameter at a predetermined set point. Finally, the coated fiber 54 is wound by feedhead 62 onto a fiber storage spool 64.

The same process described above with respect to FIG. 3 for forming core canes can alternatively be used to redraw void containing consolidated tubes. Such a redraw process can be used to modify the size of the voids contained in the tube. For example, the greater the diameter reduction that occurs when the void containing perform is redrawn, the smaller the void size will be in that preform.

Using the void producing consolidation techniques disclosed herein, optical fibers have been achieved which are comprised of a core region having a first refractive index and a cladding region having a second refractive index lower than that of the core such that light which is transmitted through the fiber is retained generally within the core, whereby said voids are located in and thereby form the cladding of said optical fiber and the void area percent of the voids is substantially non-zero.

Using the techniques described herein, fibers can be made wherein the maximum size of any of the voids, in the region where the fraction of power of light is greater than 80 percent, is less than the wavelength of light being transmitted. By maximum size, we mean the maximum diameter of any particular void when the optical fiber is viewed in perpendicular cross-section transverse to the longitudinal axis of the fiber. For example, fibers have been made wherein the maximum size of all of said voids, in the region where the fraction of power of light is greater than 80 percent, and even more preferably in the region where the fraction of power of light is greater than 90 percent, is less than 5 microns, more preferably less than 2 microns, even more preferably less than 1 micron, and most preferably less than 0.5 microns.

Using the techniques described herein, fibers can be made having void containing regions which exhibit regional void area percents of greater than 0.5 percent in some embodiments, greater than 1 percent in other embodiments, and greater than 10 percent in still other embodiments.

Index adjusting dopants such as germanium and fluorine can be used, if desired, either individually or together, to further adjust the refractive index of the core with respect to the index of refraction of the cladding or with respect to the index of refraction of pure silica. For example, in one such preferred embodiment, a germanium core cane is used as a starter rod, upon which additional soot cladding material is deposited, preferably using OVD deposition techniques as described above. The soot cladding region is then consolidated as described above to form a void containing cladding region around the germania doped silica core region. In another alternative embodiment involving index adjusting dopants, a silica core cane is employed as the starter rod for a soot cladding region. However, during the void producing consolidation step, in addition to the void producing dopant gas, a fluorine dopant source is provided (e.g. $SiF_4$ gas) to simultaneously dope the void containing region with fluorine. In this way, a fluorine doped void containing region can be formed around a silica core region. Advantages of a fluorine doped void containing region can include improved viscosity matching between various regions in the fiber.

Using the void producing consolidation techniques disclosed herein, it is possible to make optical fibers having cladding regions which exhibit a regional void area percent greater than 0.5 percent in some embodiments, greater than about 1% in other embodiments, greater than 5% in still other embodiments and greater than about 10% in yet other embodiments. While index of refraction adjusting dopants may be avoided using the techniques disclosed herein, preferably at least one of germania or fluorine or a similar index of refraction adjusting dopant is employed outside the hole-containing region together with the non-periodically distributed voids located in the cladding region of the optical fiber. The method described above is capable of enabling the placement of large or small relative amounts of voids at various locations within the radial distribution of the optical fiber. For example, using the method disclosed herein a higher regional void area percent of voids can be placed in a region which is adjacent the core of the optical fiber compared to other regions in the fiber (e.g., in the core of the fiber or the outer cladding region of the optical fiber). Likewise, the average hole size and hole size distribution in the void containing region can be controlled both in a radial and axial (i.e., along the length) direction of the fiber. Consequently, a uniform non-periodic array of holes can be located at a region in the fiber, and the relative void area percent and average hole size in this region is maintained consistently along the length of the fiber. While the fibers are not limited to any particular diameter, preferably the outer diameter of the fiber is between about 120 and 130 microns, more preferably about 125 microns.

Such a fiber can be used in telecommunication networks (typically operating in 850, 1310 and/or 1550 nm windows) including long-haul, metro, access, premise and data centers as well as data communication applications and control area networks within buildings and mobile (auto, bus, train, plane) applications. Such telecommunications networks typically include a transmitter and receiver which is optically connected to the optical fiber. Consequently, for a variety of applications, it is desirable for the holes to be formed such that the maximum hole size in the cladding for the optical fiber is less than 1550 nm, more preferably less than 775 nm, most preferably less than about 390 nm. The fibers made using the methods disclosed herein can achieve these mean diameters to within a standard deviation of 1000 nm, more preferably to within a standard deviation of 750 nm, and most preferably to within a standard deviation of 500 nm. In some embodiments, the fibers disclosed herein have less than 5000 holes, in some embodiments less than 1000 holes, and in some embodiments the total number of holes is less than 500 holes in a given optical fiber perpendicular cross-section.

For example, the fibers disclosed herein are capable of superior bend resistance compared to fibers of the prior art while simultaneously exhibiting excellent mode field diameters. By superior, we mean that using the methods disclosed herein, it is possible to make fibers which are single moded at 1550 nm in some embodiments, also at 1400 nm in other embodiments, and also at 1260 nm in still other embodiments, and which are capable of less than 0.5 dB attenuation increase at 1550 nm per turn for a 20 mm diameter bend while simultaneously exhibiting mode field diameters greater than 10 microns, and more preferably greater than 11 microns, at 1550 nm. Such excellent bend performance makes these fibers attractive candidates for fiber-to-the-home, access fiber, fiber-in-the-home applications, and fiber jumpers (these are typically short sections of fiber (1-20 meters) with connectors on each end to connect to an optical system or device). For example, the fibers disclosed herein may be employed in an optical fiber telecommunications system comprising a transmitter, a receiver, the fiber(s) being optically connected to said transmitter and receiver. Preferably in such applications (i.e. when the fiber is acting as a transmission fiber in a telecommunications system) the fiber is devoid of any active elements such as erbium, etc.

Using the void producing consolidation techniques-disclosed herein, it is possible to make optical fibers having cladding regions which exhibit a total void area percent (i.e., total cross-sectional area of the voids divided by total cross-sectional area of the optical fiber×100) greater than 0.05 percent in some embodiments, greater than about 0.1 percent in other embodiments, and greater than about 0.5 percent in still other embodiments. Fibers have been made having total void area percents greater than about 1, greater than about 5, and greater than 10 percent. However, in some embodiments, total void area percent of less than 1, and even less than 0.7, can result in greatly improved bend performance. Such void containing cladding regions can be used to lower the refractive index relative to the core and thus form the cladding region which guides light along the core of the optical fiber. By selecting the appropriate soot consolidation conditions, as will be described below, a variety of useful optical fiber designs can be achieved. For example, by selecting the maximum void size in the cladding to be less than that of the wavelength of light which is to be transmitted (for example, less than 1550 nm for some telecommunications systems), and preferably less than one half of the wavelength of light which is to be transmitted along the fiber, low attenuation fibers can be achieved without having to use expensive dopants. Consequently, for a variety of applications, it is desirable for the holes to be formed such that greater than 95% of and preferably all of the holes exhibit a mean hole size in the cladding for the optical fiber which is less than 1550 nm, more preferably less than 775 nm, most preferably less than about 390 nm. Likewise, it is preferable that the maximum diameter of the holes in the fiber be less than 7000 nm, more preferably less than 2000 nm, and even more preferably less than 1550 nm, and most preferably less than 775 nm, all of which diameters are achievable using the methods disclosed herein. In some embodiments, the fibers disclosed herein have fewer than 5000 holes, in some embodiments also fewer than 1000 holes, and in other embodiments the total number of holes is fewer than 500 holes in a given optical fiber perpendicular cross-section. Of course, the most preferred fibers will exhibit combinations of these characteristics. Thus, for example, one particularly preferred embodiment of optical fiber would exhibit fewer than 200 holes in the optical fiber, the holes having a maximum diameter less than 1550 nm and a mean diameter less than 775 nm, although useful and bend resistant optical fibers can be achieved using larger and greater numbers of holes. The hole number, mean diameter, max diameter, and total void area percent of holes can all be calculated with the help of a scanning electron microscope at a magnification of about 800× and image analysis software, such as ImagePro, which is available from Media Cybernetics, Inc. of Silver Spring, Md., USA.

The optical fiber disclosed herein may or may not include germania or fluorine to also adjust the refractive index of the core and or cladding of the optical fiber, but these dopants can also be avoided in the intermediate annular region and instead, the holes (in combination with any gas or gases that may be disposed within the holes) can be used to adjust the manner in which light is guided down the core of the fiber. The hole-containing region may consist of undoped (pure) silica, thereby completely avoiding the use of any dopants in the hole-containing region, to achieve a decreased refractive index, or the hole-containing region may comprise doped silica, e.g. fluorine-doped silica having a plurality of holes.

Figure 8:
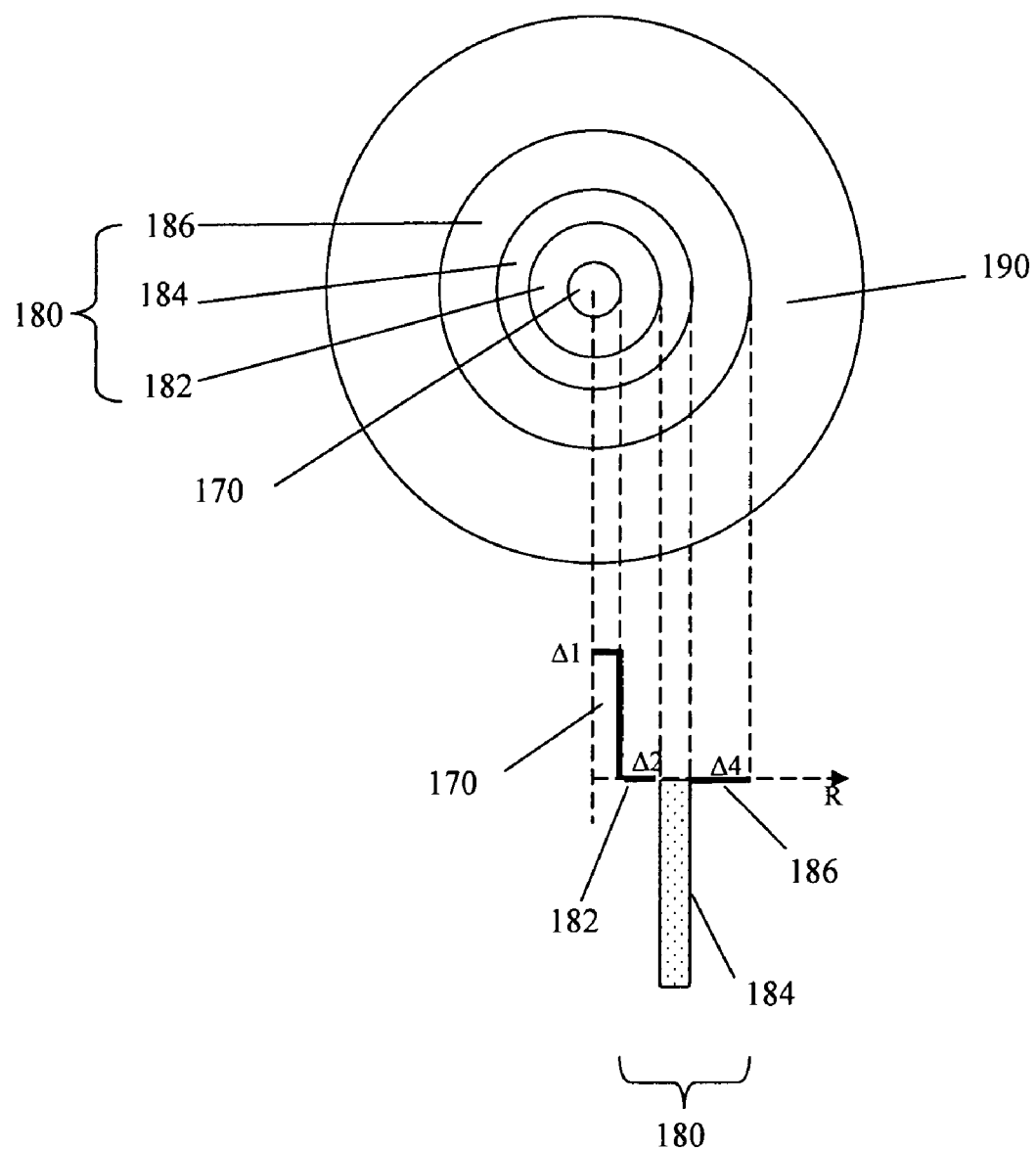
FIG. 8 schematically illustrates a cross-section of an optical fiber made in accordance with the invention, shown with a coating.

In one set of embodiments, the core region includes doped silica to provide a positive refractive index relative to pure silica, e.g. germania doped silica. The core region is preferably hole-free. As illustrated in FIG. 8, in some embodiments, the core region 170 comprises a single core segment having a positive maximum refractive index relative to pure silica $\Delta_1$ in %, and the single core segment extends from the centerline to a radius $R_1$. In one set of embodiments, 0.30%<$\Delta_1$<0.40%, and 3.0 μm<$R_1$<5.0 μm. In some embodiments, the single core segment has a refractive index profile with an alpha shape, where alpha is 6 or more, and in some embodiments alpha is 8 or more. In some embodiments, the inner annular hole-free region 182 extends from the core region to a radius $R_2$, wherein the inner annular hole-free region has a radial width W12, equal to R2−R1, and W12 is greater than 1 μm. radius R2 is preferably greater than 5 μm, more preferably greater than 6 μm. The intermediate annular hole-containing region 184 extends radially outward from R2 to radius R3 and has a radial width W23, equal to R3−R2. The outer annular region 186 extends radially outward from R3 to radius R4. Radius R4 is the outermost radius of the silica portion of the optical fiber. One or more coatings may be applied to the external surface of the silica portion of the optical fiber, starting at R4, the outermost diameter or outermost periphery of the glass part of the fiber. The core region 170 and the cladding region 180 are preferably comprised of silica. The core region 170 is preferably silica doped with one or more dopants. Preferably, the core region 170 is hole-free. The hole-containing region 184 has an inner radius R2 which is not more than 20 μm. In some embodiments, R2 is not less than 10 μm and not greater than 20 μm. In other embodiments, R2 is not less than 10 μm and not greater than 18 μm. In other embodiments, R2 is not less than 10 μm and not greater than 14 μm. The hole-containing region 184 has a radial width W23 which is not less than 0.5 μm. In some embodiments, W23 is not less than 0.5 μm and not greater than 20 μm. In other embodiments, W23 is not less than 2 μm and not greater than 12 μm. In other embodiments, W23 is not less than 2 μm and not greater than 10 μm.

The cladding region 180 extends to a radius $R_4$ which is preferably not less than 40 μm; in some embodiments, $R_4$ is about 40 μm; in other embodiments, $R_4$ is not less than 60 μm; in other embodiments, $R_4$ is about 62.5 μm. In some embodiments, the outer annular region 180 has a radial width not less than 20 μm. In other embodiments, the outer hole-free region 186 has a radial width not less than 30 μm. In still other embodiments, the outer hole-free region 186 has a radial width not less than 40 μm. In some embodiments, the core region 170 comprises germania doped silica. In other embodiments, the core region 170 comprises fluorine doped silica.

The core region preferably comprises a central core segment extending radially outwardly from the centerline.

In one set of embodiments, the core region 170 comprises a single core segment having a relative refractive index $\Delta 1$ which is positive relative to pure silica. The single core segment can have a refractive index profile with a step shape or a rounded step shape or other shape. In some of these embodiments, the single core segment has a refractive index profile with an alpha shape, and preferably alpha is not less than 8. Preferably, the single core segment extends to a radius R1 which is not less than 3.8 μm, and in some embodiments, R1 is not less than 4.0 μm and not more than 4.5 μm. In some embodiments, the core region extends to a radius $R_1$, wherein the hole-containing region has an inner radius R2, and wherein the ratio R1/R2 is between 2.5 and 4.5.

The core region 170 can comprise a plurality of core segments, thus the core region comprises at least one core segment in any of the embodiments disclosed herein.

In some embodiments, the refractive index profile of the core region 170 provides single-moded transmission of the optical signals at 1550 nm, and further preferably provides a zero dispersion wavelength between 1300 and 1324 nm, and further preferably provides a mode field diameter at 1310 nm greater than 8.6 μm.

In some embodiments, $\Delta_1$ is not more than 0.40%. In other embodiments, $\Delta_1$ is not more than 0.38%.

In some embodiments, the hole-containing region comprises between about 25 and 200 holes.

In some embodiments, the maximum diameter of the holes in said hole-containing region is less than 775 nm.

Preferably, the optical fiber disclosed herein further comprises a coating surrounding and directly adjacent the cladding region. In some embodiments, the optical fiber comprises a single coating layer surrounding and directly adjacent the cladding region.

In some embodiments, at least some of the holes contain at least one gas selected from the group consisting of argon, nitrogen, carbon monoxide, carbon dioxide, chlorine, oxygen, $CF_4$, $C_2F_6$, $SO_2$, Kr, Ne, and mixtures thereof.

In one aspect of the present invention, an optical transmission system is disclosed herein comprising a microstructured optical fiber, an optical source optically coupled to the optical fiber, and a receiver optically coupled to the optical fiber, wherein the optical source generates optical signals comprised of light at a transmission wavelength and the optical fiber transmits the optical signals from the optical source to the receiver, wherein the optical fiber comprises a core region having a refractive index profile with a first refractive index, and a cladding region surrounding the core region and having a second refractive index which is lower than that of the core region such that the light transmitted through the fiber is retained generally within the core region, wherein said cladding region comprises an intermediate annular hole-containing region surrounding the core region, and an outer annular hole-free region surrounding and directly adjacent the hole-containing region, wherein the hole-containing region is comprised of holes having a maximum (cross-sectional) diameter less than the transmission wavelength. Preferably, none of the holes has a mean diameter greater than the transmission wavelength.

EXAMPLES

The invention will be further illustrated by the following examples. Unless otherwise noted, in each of the examples below, when the fiber was drawn the fiber was coated using conventional coatings (i.e. conventional acrylate based primary and secondary coatings).

Example 1

4600 grams of SiO2 (0.42 g/cc density) soot were deposited via OVD onto a fully consolidated 1 meter long×10 mm diameter step index (0.35 percent delta, 0.33 core/clad diameter ratio) GeO2-SiO2 core-SiO2 clad core cane, thereby resulting in a preform comprising a consolidated core region which was surrounded by a consolidated silica cladding region which in turn was surrounded by a soot silica region. The soot cladding of this assembly was then sintered as follows. The assembly was first dried for 2 hours in an atmosphere consisting of helium and 3 percent chlorine at 1000° C. followed by down driving at 6 mm/min through a hot zone set at 1500° C. (corresponding to a 3° C./min temperature increase for the outside of the soot preform during the downdrive process) in a 100% oxygen (by volume) atmosphere in order to sinter the soot to an oxygen-seeded overclad blank. The blank was placed for 24 hours in an argon purged holding oven set at 1000° C. to outgas the helium from the blank.

The optical fiber preform was drawn to 125 micron diameter fiber at 18 meters/second in a furnace having an 8" long hot zone set at 2000° C. The resultant optical fiber is illustrated in FIG. 6. SEM analysis of the end face of a fiber showed an approximately 4 micron radius GeO2-SiO2 core surrounded by a 12 micron outer radius void-free near clad region surrounded by 18 micron outer radius void containing cladding region (ring thickness of about 6 microns) which is surrounded by a void-free pure silica outer cladding having an outer diameter of 125 microns (all radial dimensions measured from the center of the optical fiber). The void containing ring region comprised 4.2 percent regional area percent holes (100 percent O2 by volume) in that area with an average diameter of 0.53 microns and the smallest diameter holes at 0.18 microns and a maximum diameter of 1.4 microns, resulting in about 85 total number of holes in the fiber cross-section. Because of the relatively slow downdrive and sinter rate, the holes were located adjacent to the region corresponding to here the GeO2-SiO2 core-SiO2 clad core cane was during consolidation and extending out from a radial distance from the fiber centerline of 12 microns to about 18 microns radial distance across the fiber cross-section. The total fiber void area percent (area of the holes divided by total area of the optical fiber cross-section×100) was about 0.21 percent. Optical properties for this fiber were 0.34 and 0.21 dB/Km at 1310 and 1550 nm, respectively, and a fiber cutoff of about 1230 nm, thereby making the fiber single moded at wavelengths above 1230 nm. A portion of this fiber was measured for bend performance around a 10 mm diameter mandrel, and the fiber exhibited an increase in attenuation at 1550 nm of about 0.7 dB/turn, thus demonstrating that attenuation increases of even less than 5 dB/turn, and even less than 1 dB/turn, around a 10 mm diameter mandrel. This same portion of the fiber was measured for bend performance around a 20 mm diameter mandrel, and the fiber exhibited an increase in attenuation at 1550 m of about 0.08 dB/turn, thus demonstrating that attenuation increases of less than 1 dB/turn, and even less than 0.5 dB/turn, and even less than 0.1 dB/turn around a 20 mm diameter mandrel are achievable.

Example 2

200 grams of SiO2 (0.42 g/cc density) soot were deposited via OVD onto a fully consolidated 1 meter long×10.6 mm diameter step index (0.35 percent delta, 0.33 core/clad diameter ratio) GeO2-SiO2 core-SiO2 clad core cane (similar to Example 1), thereby resulting in a preform comprising a consolidated core region which was surrounded by a consolidated silica cladding region which in turn was surrounded by a soot silica region. The soot cladding of this assembly was then sintered as follows. The assembly was first dried for 2 hours in an atmosphere consisting of helium and 3 percent chlorine at 1000° C. followed by down driving at 200 mm/min (corresponding to approximately a 100° C./min temperature increase for the outside of the soot preform during the downdrive process) through a hot zone set at 1490° C. in a 100 percent oxygen sintering atmosphere. The preform assembly was than re-down driven (i.e., a second time) through the hot zone at 100 mm/min (corresponding to approximately a 50° C./min temperature increase for the outside of the soot preform during the downdrive process). The preform assembly was than re-down driven (i.e., a third time) through the hot zone at 50 mm/min (corresponding to approximately a 25° C./min temperature increase for the outside of the soot preform during the downdrive process). The preform assembly was than re-down driven (i.e., a forth time) through the hot zone at 25 mm/min (corresponding to approximately a 12.5° C./min temperature increase for the outside of the soot preform during the downdrive process), then final sintered at 6 mm/min (approximately 3° C./min heat up rate) in order to sinter the soot into a oxygen-seeded overclad blank. The first series of higher downfeed rate were employed to glaze the outside of the optical fiber preform, which facilitates trapping of the gases in the preform. The blank was then placed for 24 hours in an argon purged holding oven set at 1000° C. This preform was then placed back in a lathe where 4700 grams of additional SiO2 (0.53 g/cc density) soot were deposited via OVD. The soot of this cladding (which may be called overcladding) for this assembly was then sintered as follows. The assembly was first dried for 2 hours in an atmosphere consisting of helium and 3 percent chlorine at 1000° C. followed by down driving at 6 mm/min through a hot zone set at 1500° C. in a 100% helium (by volume) atmosphere in order to sinter the soot to a germania containing void-free core, silica void-free inner cladding, silica oxygen-seeded ring (i.e. silica with holes containing oxygen), and void-free overclad blank. The blank was placed for 24 hours in an argon purged holding oven set at 1000° C. to outgas the helium from the blank. The optical fiber preform was drawn to about 125 Micron diameter fiber at 20 meters/second in a furnace having an 8" long hot zone set at 2000° C. SEM analysis of the end face of a fiber showed an approximately 4 micron radius GeO2-SiO2 core surrounded by a 12 micron outer radius void-free near clad region surrounded by 16 micron outer radius void containing cladding region (ring thickness of approximately 4 microns) which is surrounded by a void-free pure silica outer cladding having an outer diameter of about 125 microns (all radial dimensions measured from the center of the optical fiber). The void containing ring region comprised 2.0 percent regional area percent holes (100 percent O2 by volume) in that area with an average diameter of 0.3 microns and the smallest diameter holes at 0.05 microns and a maximum diameter of 0.72 microns, resulting in about 80 total number of holes in the fiber cross-section. The total fiber void area percent (area of the holes divided by total area of the optical fiber cross-section×100) was about 0.06 percent. Optical properties for this fiber were 0.35 and 0.19 dB/Km at 1310 and 1550 nm, respectively, and a fiber cutoff of about 1357 nm, thereby making the fiber single moded at wavelengths above 1357 nm. A portion of this fiber was measured for bend performance around a 10 mm diameter mandrel, and the fiber exhibited an increase in attenuation at 1550 nm of about 0.2 dB/turn, thus demonstrating attenuation increases of even less than 1 dB/turn, preferably less than 0.5 dB/turn, around a 10 mm diameter mandrel. This same portion of the fiber was measured for bend performance around a 20 mm diameter mandrel, and the fiber exhibited an increase in attenuation at 1550 nm of about 0.02 dB/turn, thus demonstrating that attenuation increases of less than 1 dB/turn, and more preferably less than 0.1 dB/turn, and still more preferably less than 0.05 dB/turn, around a 20 mm diameter mandrel are achievable. This same portion of the fiber was measured for bend performance around an 8 mm diameter mandrel, and the fiber exhibited an increase in attenuation at 1550 nm of about 2 dB/turn, thus demonstrating that attenuation increases of less than 10 dB/turn, and more preferably less than 5 dB/turn, and still more preferably less than 3 dB/turn, around an 8 mm diameter mandrel are achievable.

Example 3

290 grams of SiO2 (0.47 g/cc density) soot were deposited via OVD onto a fully consolidated 1 meter long ×10.4 mm diameter step index (0.35 percent delta, 0.33 core/clad diameter ratio) GeO2SiO2 core-SiO2 clad core cane (similar to Example 1), thereby resulting in a preform comprising a consolidated core region which was surrounded by a consolidated silica cladding region which in turn was surrounded by a soot silica region. The soot cladding of this assembly was then sintered as follows. The assembly was first dried for 2 hours in an atmosphere consisting of helium and 3 percent chlorine at 1000° C. followed by down driving at 200 mm/min (corresponding to approximately a 100° C./min temperature increase for the outside of the soot preform during the downdrive process) through a hot zone set at 1490° C. in a 100 percent oxygen sintering atmosphere. The preform assembly was than re-down driven (i.e., a second time) through the hot zone at 100 mm/min (corresponding to approximately a 50° C./min temperature increase for the outside of the soot preform during the downdrive process). The preform assembly was than re-down driven (i.e., a third time) through the hot zone at 50 mm/min (corresponding to approximately a 25° C./min temperature increase for the outside of the soot preform during the downdrive process). The preform assembly was than re-down driven (i.e., a forth time) through the hot zone at 25 mm/min (corresponding to approximately a 12.5° C./min temperature increase for the outside of the soot preform during the downdrive process), then final sintered at 6 mm/min (approximately 3° C./min heat up rate) in order to sinter the soot into a oxygen-seeded overclad blank. The first series of higher downfeed rate were employed to glaze the outside of the optical fiber preform, which facilitates trapping of the gases in the preform. The blank was then placed for 24 hours in an argon purged holding oven set at 1000° C. This preform was then placed back in a lathe where 3600 grams of additional SiO2 (0.42 g/cc density) soot were deposited via OVD. The soot of this cladding (which may be called overcladding) for this assembly was then sintered as follows. The assembly was first dried for 2 hours in an atmosphere consisting of helium and 3 percent chlorine at 1000° C. followed by down driving at 6 mm/min through a hot zone set at 1500° C. in a 100% helium (by volume) atmosphere in order to sinter the soot to a germania containing void-free core, silica void-free inner cladding, silica oxygen-seeded ring (i.e. silica with holes containing oxygen), and void-free overclad blank. The blank was placed for 24 hours in an argon purged holding oven set at 1000° C. to outgas the helium from the blank. The optical fiber preform was drawn to about 125 micron diameter fiber at 20 meters/second in a furnace having an 8" long hot zone set at 2000° C. SEM analysis of the end face of a fiber showed an approximately 4 micron radius GeO2-SiO2 core surrounded by a 12 micron outer radius void-free near clad region surrounded by 18 micron outer radius void containing cladding region (ring thickness of approximately 6 microns) which is surrounded by a void-free pure silica outer cladding having an outer diameter of about 125 microns (all radial dimensions measured from the center of the optical fiber). The void containing ring region comprised 2.7 percent regional area percent holes (100 percent $O_2$ by volume) in that area with an average diameter of 0.36 microns and the smallest diameter holes at 0.05 microns and a maximum diameter of 0.8 microns, resulting in about 105 total number of holes in the fiber cross-section. The total fiber void area percent (area of the holes divided by total area of the optical fiber cross-section ×100) was about 0.11 percent. Optical properties for this fiber were 0.33 and 0.19 dB/Km at 1310 and 1550 nm, respectively, and a fiber cutoff of about 1250 nm, thereby making the fiber single moded at wavelengths above 1250 nm. A portion of this fiber was measured for bend performance around a 10 mm diameter mandrel, and the fiber exhibited an increase in attenuation at 1550 nm of about 0.2 dB/turn, thus demonstrating attenuation increases of even less than 1 dB/turn, preferably less than 0.5 dB/turn, around a 10 mm diameter mandrel. This same portion of the fiber was measured for bend performance around a 20 mm diameter mandrel, and the fiber exhibited an increase in attenuation at 1550 nm of about 0.02 dB/turn, thus demonstrating that attenuation increases of less than 1 dB/turn, and more preferably less than 0.1 dB/turn, and still more preferably less than 0.05 dB/turn, around a 20 mm diameter mandrel are achievable. This same portion of the fiber was measured for bend performance around an 8 mm diameter mandrel, and the fiber exhibited an increase in attenuation at 1550 nm of about 2 dB/turn, thus demonstrating that attenuation increases of less than 10 dB/turn, and more preferably less than 5 dB/turn, and still more preferably less than 3 dB/turn, around an 8 mm diameter mandrel are achievable.

The following examples 4-9 were made in accordance with methods similar to those disclosed in the above examples 2 and 3 (i.e., OVD deposition process steps). In all cases, the core 170 was germania doped silica and a hole containing region 184 was employed a distance from the outside of the core diameter. An undoped inner annular hole-free region 182 was employed between the core 170 and annular hole-containing region 184. An outer annular region 186 made of pure undoped silica was deposited over hole-containing region 184. No fluorine was employed in the fiber core or cladding in any of these examples. Examples 4, 5, and 6 were sintered in 100 percent nitrogen gas (instead of oxygen), and as a result nitrogen was present in the non-periodically located voids contained in void containing annular region 184 of the resultant fiber. Examples 7, 8, and 9 were sintered in 100 percent argon gas (instead of oxygen), and as a result argon was present in the non-periodically located voids contained in void containing annular region 184 of the resultant fiber. Also set forth are the core clad ratios of each of the example fibers, the core clad ratio being the ratio of the outside diameter of the germania doped core region 170 divided by the inner diameter of the hole containing region 184. The core clad region is adjusted by the amount of undoped silica deposited and consolidated in inner annular hole-free region 182 between the core and the hole containing region 184. In each of examples 4 through 9 the regional area percent holes was greater than 1 percent and less than 10 percent, the total fiber void area percent was greater than 0.05 percent and less than 0.25 percent, the average hole diameter was greater than 0.1 and less than 1 micron, and the total number of holes (taken in cross-section) was greater than 10 and less than 200. As can be seen in the table below, it is possible using the fiber designs disclosed herein to manufacture very high bend resistant fibers which are in all respects ITU-T G.652 compliant. In particular, it is possible to produce fibers having an attenuation less than 0.34 dB/km at 1310 nm, an attenuation less than 0.21 dB/km, more preferably less than 0.20 dB/km at 1550 nm, a cable (22 m test) cutoff wavelength of less than 1260 nm, more preferably less than 1200 nm, a mode field diameter greater than 7.8 microns, more preferably greater than 8.0 microns, and most preferably greater than 8.2 microns at 1310 nm, a mode field greater than 9 microns, more preferably greater than 9.5 microns, and most preferably greater than 10 microns at 1550 nm, a zero dispersion wavelength between 1300 and 1324 nm, dispersion at 1550 nm of between about 15 and 19 ps/nmkm, and still achieve a 10 mm bend loss less than 5.0 dB/turn, more preferably less than 2.0 dB/turn, even more preferably less than 1.0 dB/turn, most preferably less than 0.5 dB/turn and a 20 mm bend loss less than 0.2 dB/turn, more preferably less than 0.1 dB/turn, even more preferably less than 0.05 dB/turn, and most preferably less than 0.03 dB/turn. In fact, can be seen in the Table below, 20 mm bend loss of lower than 0.02 dB/turn and less than 0.01 dB/turn is achievable.

|  | Example #4 | Example #5 | Example #6 | Example #7 | Example #8 | Example #9 |
| --- | --- | --- | --- | --- | --- | --- |
| Core Diameter (μm) | 4.25 | 4.4 | 4.2 | 4.5 | 4.25 | 4.25 |
| Width of hole containing region 184 | 3.15 um | 3.3 um | 3 um | 2.6 um | 3.1 um | 3.1 um |
| Core/clad ratio | 0.41 c/c | 0.41 c/c | 0.33 c/c | 0.33 c/c | 0.43 c/c | 0.41 c/c |
| 1310 attn. (dB/km) | 0.334 |  | 0.363 |  | 0.351 |  |
| 1550 attn. (dB/km) | 0.197 | 0.211 | 0.205 | 0.195 | 0.226 | 0.193 |
| 2 m cutoff (nm) | 1220 | 1320 | 1300 | 1370 | 1234 | 1260 |
| 22 m cutoff (nm) | 1140 | 1260 | 1240 | 1250 | 1169 | 1200 |
| 1310 MFD (microns) | 8.236 | 8.44 | 8.59 | 8.8 | 9.16 | 8.27 |
| 1550 MFD (microns) | 9.26 | 9.43 | 9.82 | 10 | 10.18 | 9.29 |
| Lambda 0 (nm) | 1321 | 1314 | 1329 | 1322 | 1311 | 1317 |
| 5 × 10 mm bend loss (dB/turn) | 0.084 | 0.073 | 0.07 | 0.02 | 0.6 | 0.056 |
| 5 × 20 mm bend loss (dB/turn) | 0.008 | 0.003 | 0.003 | 0.001 | 0.049 | 0.002 |

In one set of embodiments, a microstructured optical fiber is disclosed herein for transmitting optical signals comprised of light, the optical fiber comprising: a core region disposed about a longitudinal centerline and having a refractive index profile with a first refractive index, and a cladding region surrounding the core region, the cladding region comprising an annular hole-containing region comprised of non-periodically disposed holes, wherein the optical fiber has a fiber cutoff of less than 1500 nm, in some of these embodiments less than 1400 nm, and in some of these embodiments less than 1310 nm.

In some embodiments, the optical fiber has a cable cutoff of less than 1300, more preferably less than 1260, and most preferably less than 1200 nm.

In some embodiments, the non-periodically disposed holes have a maximum diameter of less than 2000 nm.

In some embodiments, the non-periodically disposed holes have a mean diameter of less than 2000 nm.

In some embodiments, the optical fiber has a 20 mm macrobend induced loss of less than 1 dB/turn, preferably less than 0.1 dB/turn, more preferably less than 0.05 dB/turn, and even more preferably less than 0.02 dB/turn.

In some embodiments, the optical fiber has a 12 mm macrobend induced loss of less than 5 dB/turn, preferably less than 1 dB/turn, more preferably less than 0.5 dB/turn.

In some embodiments, the optical fiber has a 8 mm macrobend induced loss of less than 5 dB/turn, preferably less than 1 dB/turn, more preferably less than 0.5 dB/turn.

In one subset of embodiments, the optical fiber has a fiber cutoff of less than 1400 nm and a 20 mm macrobend induced loss of less than 1 dB/turn, preferably less than 0.1 dB/turn, more preferably less than 0.05 dB/turn.

In another subset of embodiments, the optical fiber has a fiber cutoff of less than 1400 nm and a 12 mm macrobend induced loss of less than 5 dB/turn, preferably less than 1 dB/turn, more preferably less than 0.5 dB/turn.

In yet another subset of embodiments, the optical fiber has a fiber cutoff of less than 1400 nm and a 8 mm macrobend induced loss of less than 5 dB/turn, preferably less than 1 dB/turn, more preferably less than 0.5 dB/turn.

In another subset of embodiments, the optical fiber has a fiber cutoff of less than 1310 nm and a 20 mm macrobend induced loss of less than 1 dB/turn, preferably less than 0.1 dB/turn, more preferably less than 0.05 dB/turn, even more preferably less than 0.03 dB/turn.

In another subset of embodiments, the optical fiber has a fiber cutoff of less than 1310 nm and a 12 mm macrobend induced loss of less than 5 dB/turn, preferably less than 1 dB/turn, more preferably less than 0.5 dB/turn.

In another subset of embodiments, the optical fiber has a fiber cutoff of less than 1310 nm and a 8 mm macrobend induced loss of less than 5 dB/turn, preferably less than 1 dB/turn, more preferably less than 0.5 dB/turn.

In some embodiments, the annular hole-containing region has a maximum radial width of less than 12 microns, preferably less than 10 microns, more preferably greater than 2 microns and less than 10 microns.

In some embodiments, the annular hole-containing region has a regional void area percent of less than 30 percent, in other embodiments less than 20 percent, in other embodiments less than 10 percent, and in still other embodiments less than 5 percent.

In some embodiments, the non-periodically disposed holes have a mean diameter of less than 2000 nm, in other embodiments less than 1550 nm, in other embodiments less than 1500 nm, in still other embodiments less than 850 nm, in yet other embodiments less than 750 nm, in other embodiments less than 360 nm, in still other embodiments less than 250 nm.

In one subset of embodiments, the non-periodically disposed holes have a mean diameter of less than 1550 nm, and the annular hole-containing region has a maximum radial width of less than 12 microns and a regional void area percent of less than 30%.

In another subset of embodiments, the non-periodically disposed holes have a mean diameter of less than 1550 nm, and the annular hole-containing region has a maximum radial width of between 2 and 12 microns and a regional void area percent of less than 30%.

In yet another subset of embodiments, the non-periodically disposed holes have a mean diameter of less than 1550 nm, and the annular hole-containing region has a maximum radial width of between about 2 and 5 microns and a regional void area percent of less than about 15%.

In another subset of embodiments, the non-periodically disposed holes have a mean diameter of less than 1550 nm, and the annular hole-containing region has a maximum radial width of between about 2 and 10 microns and a regional void area percent of less than about 5%.

In yet another subset of embodiments, the non-periodically disposed holes have a mean diameter of less than 1550 nm, and the annular hole-containing region has a maximum radial width of between about 2 and 8 microns and a regional void area percent of less than about 10%, more preferably less than about 8%.

In another subset of embodiments, the non-periodically disposed holes have a mean diameter of less than 750 nm, and the annular hole-containing region has a maximum radial width of between about 2 and 6 microns and a regional void area percent of less than about 5%.

In yet another subset of embodiments, the non-periodically disposed holes have a mean diameter of less than 750 nm, and the annular hole-containing region has a maximum radial width of between about 2 and 10 microns and a regional void area percent of less than about 3%.

In another subset of embodiments, the non-periodically disposed holes have a mean diameter of less than 360 nm, and the annular hole-containing region has a maximum radial width of between about 2 and 6 microns and a regional void area percent of less than about 3%.

In yet another subset of embodiments, the non-periodically disposed holes have a mean diameter of less than 1550 nm, the annular hole-containing region has a regional void area percent, A, and a maximum radial width, W, of between about 2 and 12 microns, where $A < 39.4 - 5.36 \cdot W$, where W is in microns.

In some embodiments, the annular hole-containing region has a regional void area percent greater than 0.05%.

In another set of embodiments, a microstructured optical fiber is disclosed herein for transmitting optical signals comprised of light, the optical fiber comprising: a core region disposed about a longitudinal centerline, and a cladding region surrounding the core region, the cladding region comprising an annular hole-containing region comprised of non-periodically disposed holes; wherein the annular hole-containing region has a maximum radial width of less than 12 microns; wherein the annular hole-containing region has a regional void area percent of less than 30 percent; and wherein the non-periodically disposed holes have a mean diameter of less than 1550 nm.

In some embodiments, the annular hole-containing region has a maximum radial width of greater than 0.5 microns and less than 12 microns, and in other embodiments, greater than 2 microns and less than 12 microns.

In some embodiments, the annular hole-containing region has a regional void area percent of greater than 0.05 percent and less than 30 percent.

In some embodiments, the non-periodically disposed holes have a mean diameter of greater than 1 nm and less than 1550 nm.

In some embodiments, the non-periodically disposed holes have a maximum diameter of less than 2000 nm.

In some embodiments, the core region comprises a maximum relative refractive index of less than 0.40%, and in other embodiments between 0.30% and 0.40%.

In some embodiments, the core region extends radially outwardly to a core radius of less than 5 microns, and in other embodiments between 3.0 μm and 5.0 μm.

In some embodiments, the cladding region extends to an outermost glass radius not less than 40 μm; not less than 60 μm.

In some embodiments, the optical fiber has a fiber cutoff of less than 1550 nm, in other embodiments less than 1400 nm, and in yet other embodiments less than 1310 nm.

In a subset of these embodiments, the cladding region further comprises: an inner annular hole-free region disposed between the core region and the annular hole-containing region; and an outer annular hole-free region surrounding and directly adjacent the annular hole-containing region. In some embodiments, the inner annular hole-free region has a radial width greater than 1 µm, preferably greater than 5 µm, more preferably greater than 6 µm. In some embodiments, the hole-containing region has an inner radius which is not more than 20 µm, and other embodiments not less than 10 µm and not greater than 20 µm, and in still other embodiments not less than 10 µm and not greater than 18 µm, and in yet other embodiments not less than 10 µm and not greater than 14 µm. In some embodiments, the outer hole-free annular region has a radial width not less than 20 µm, in other embodiments not less than 30 µm, and in still other embodiments not less than 40 µm.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

What is claimed is:

1. A microstructured optical fiber for transmitting optical signals comprised of light, the optical fiber comprising:
    a core region disposed about a longitudinal centerline and having a refractive index profile with a first refractive index, and
    a cladding region surrounding the core region, the cladding region comprising an annular hole-containing region comprised of non-periodically disposed holes; wherein the optical fiber has a fiber cutoff of less than 1500 nm.

2. The optical fiber of claim 1 wherein the optical fiber has a cable cutoff of less than 1300 nm.

3. The optical fiber of claim 1 wherein the optical fiber has a cable cutoff of less than 1260 nm.

4. The optical fiber of claim 1 wherein the optical fiber has a 20 mm macrobend induced loss of less than 0.2 dB/turn at 1550 nm.

5. The optical fiber of claim 1 wherein the optical fiber has a 10 mm macrobend induced loss of less than 5 dB/turn at 1550 nm.

6. The optical fiber of claim 1 wherein the non-periodically disposed holes have a maximum diameter of less than 2000 nm.

7. The optical fiber of claim 1 wherein the non-periodically disposed holes have a mean diameter of less than 2000 nm.

8. The optical fiber of claim 1 wherein the annular hole-containing region has a maximum radial width of less than 12 microns.

9. The optical fiber of claim 1 wherein the annular hole-containing region has a regional void area percent of less than 30 percent.

10. The optical fiber of claim 1 wherein the non-periodically disposed holes have a mean diameter of less than 1550 nm.

11. The optical fiber of claim 1 wherein the non-periodically disposed holes have a mean diameter of less than 1550 nm, and the annular hole-containing region has a maximum radial width of between about 2 and 10 microns and a regional void area percent of less than about 5%.

12. The optical fiber of claim 1 wherein the non-periodically disposed holes have a mean diameter of less than 750 nm, and the annular hole-containing region has a maximum radial width of between about 2 and 10 microns and a regional void area percent of less than about 3%.

13. The optical fiber of claim 1 wherein the optical fiber has a mode field diameter greater than 8 microns at a wavelength of 1310 nm.

14. A microstructured optical fiber for transmitting optical signals comprised of light, the optical fiber comprising:
    a core region disposed about a longitudinal centerline, and
    a cladding region surrounding the core region, the cladding region comprising an annular hole-containing region comprised of non-periodically disposed holes;
    wherein the annular hole-containing region has a maximum radial width of less than 12 microns;
    wherein the annular hole-containing region has a regional void area percent of less than 30 percent; and
    wherein the non-periodically disposed holes have a mean diameter of less than 1550 nm.

15. The optical fiber of claim 14 wherein the annular hole-containing region has a maximum radial width of greater than 0.5 microns and less than 12 microns.

16. The optical fiber of claim 14 wherein the annular hole-containing region has a regional void area percent of greater than 0.05 percent and less than 30 percent.

17. The optical fiber of claim 14 wherein the non-periodically disposed holes have a mean diameter of greater than 1 nm and less than 1550 nm.

18. The optical fiber of claim 14 wherein the non-periodically disposed holes have a maximum diameter of less than 2000 nm.

19. The optical fiber of claim 14 wherein said cladding region further comprises:
    an inner annular hole-free region disposed between the core region and the annular hole-containing region; and
    an outer annular hole-free region surrounding and directly adjacent the annular hole-containing region.

20. The optical fiber of claim 14 wherein the inner annular hole-free region has a radial width greater than 1 µm.

21. The optical fiber of claim 14 wherein the hole-containing region has an inner radius between 10 µm and 20 µm.

22. The optical fiber of claim 14 wherein the cladding region extends to an outermost glass radius not less than 40 µm.

23. The optical fiber of claim 14 wherein the outer hole-free annular region has a radial width not less than 20 µm.

24. The optical fiber of claim 14 wherein the core region comprises a maximum relative refractive index of less than 0.40%.

25. The optical fiber of claim 14 wherein the core region extends radially outwardly to a core radius of less than 5 microns.

26. The optical fiber of claim 14 wherein the optical fiber has a fiber cutoff of less than 1550 nm.

27. An optical transmission system comprising:
    a microstructured optical fiber;
    an optical source optically coupled to the optical fiber;
    a receiver optically coupled to the optical fiber,
    wherein the optical source generates optical signals comprised of light at a transmission wavelength and the optical fiber transmits the optical signals from the optical source to the receiver;
    wherein the optical fiber comprises:
    a core region having a refractive index profile with a first refractive index, and a cladding region surrounding the core region and having a second refractive index which is lower than that of the core region such that the light transmitted through the fiber is retained generally within the core region, the cladding region comprising an annular hole-containing region comprised of non-periodically disposed holes;

wherein the optical fiber exhibits a fiber cutoff of less than 1500 nm, wherein said cladding region comprises:

a hole-containing region surrounding the core region, and an outer hole-free region surrounding and directly adjacent the hole-containing region, wherein the hole-containing region is comprised of holes having a maximum diameter less than the transmission wavelength.

28. An optical fiber comprising:

a core region, and a cladding region surrounding the core region, the cladding region comprising an annular hole-containing region comprised of non-periodically disposed holes:

wherein the optical fiber has a 20 mm macrobend induced loss of less than 0.5 dB/turn at 1550 nm, a mode field diameter 1550 nm greater than 10 microns, a fiber cutoff of less than 1400 nm, and wherein the optical fiber contains substantially no fluorine.

29. The optical fiber of claim 28 wherein the cladding region comprises an annular hole-containing region.

30. The optical fiber of claim 28 wherein the optical fiber has a mode field diameter greater than 11 microns at 1550 nm.

31. An optical fiber comprising:

a core region, and a cladding region surrounding the core region, wherein the optical fiber has a spectral attenuation at 1550 nm less than 0.20 dB/km, a 20 mm macrobend induced loss of less than 0.5 dB/turn at 1550 nm, a mode field diameter 1550 nm greater than 9.0 microns, and a cable cutoff of less than 1300 nm, and wherein the optical fiber comprises an annular hole-containing region.

32. The optical fiber of claim 31, wherein said annular hole containing region is spaced from said core.

* * * * *